(12) United States Patent
Cham et al.

(10) Patent No.: US 11,115,786 B1
(45) Date of Patent: *Sep. 7, 2021

(54) METHOD FOR SMS SERVICE CONTINUITY, NETWORK PREFERENCE, AND REPORTING LOGIC

(71) Applicant: CSC HOLDINGS, LLC, Bethpage, NY (US)

(72) Inventors: Dev Cham, New Providence, NJ (US); Suman Pothuraju, Ozone Park, NY (US)

(73) Assignee: CSC Holdings, LLC, Bethpage, NY (US)

( * ) Notice: Subject to any disclaimer, the term of this patent is extended or adjusted under 35 U.S.C. 154(b) by 63 days.

This patent is subject to a terminal disclaimer.

(21) Appl. No.: 16/568,968

(22) Filed: Sep. 12, 2019

Related U.S. Application Data

(60) Continuation of application No. 15/947,284, filed on Apr. 6, 2018, now Pat. No. 10,419,899, which is a (Continued)

(51) Int. Cl.
*H04L 12/28* (2006.01)
*H04W 4/14* (2009.01)
(Continued)

(52) U.S. Cl.
CPC .......... *H04W 4/14* (2013.01); *H04L 61/2007* (2013.01); *H04W 60/005* (2013.01)

(58) Field of Classification Search
CPC ..... H04W 4/14; H04W 60/005; H04W 60/00; H04W 60/04; H04W 88/02; H04W 88/06;
(Continued)

(56) References Cited

U.S. PATENT DOCUMENTS 5,016,243 A 5/1991 Fite, Jr.
5,590,118 A 12/1996 Nederlof
(Continued)

OTHER PUBLICATIONS

Non-Final Office Action dated Feb. 18, 2015 for U.S. Appl. No. 13/835, 615, filed Mar. 15, 2013; 14 pages.
(Continued)

*Primary Examiner* — Stephen M D Agosta
(74) *Attorney, Agent, or Firm* — Sterne, Kessler, Goldstein & Fox P.L.L.C.

(57) ABSTRACT

Embodiments include originating and terminating a short message service (SMS) message using an IP network. Delivery of an SMS message is attempted on a first network a first predetermined number of times according to a first predetermined time schedule. Delivery of the SMS message on a second network is attempted after a failure to deliver the SMS message on the first network. Reattempted delivery of the SMS message on the first network is followed by reattempted delivery of the SMS message on the second network, according to a second predetermined time schedule. Embodiments also include monitoring registration of a recipient of the SMS message, receiving a new registration, and attempting delivery of the SMS message on the network associated with the new registration.

20 Claims, 12 Drawing Sheets

Related U.S. Application Data continuation of application No. 14/926,177, filed on Oct. 29, 2015, now Pat. No. 9,973,907, which is a division of application No. 13/835,615, filed on Mar. 15, 2013, now Pat. No. 9,204,269.

(60) Provisional application No. 61/667,348, filed on Jul. 2, 2012.

(51) Int. Cl.
*H04L 29/12* (2006.01)
*H04W 60/00* (2009.01)

(58) Field of Classification Search
CPC . H04W 92/00; H04L 61/2007; H04L 65/1073
See application file for complete search history.

(56) References Cited

U.S. PATENT DOCUMENTS

| | | |
|---|---|---|
| 5,856,981 A | 1/1999 | Voelker |
| 6,216,001 B1 | 4/2001 | Ghirnikar et al. |
| 6,311,288 B1 | 10/2001 | Heeren et al. |
| 6,678,524 B1 | 1/2004 | Hanson et al. |
| 6,938,031 B1 | 8/2005 | Zoltan et al. |
| 7,085,812 B1 | 8/2006 | Sherwood |
| 7,171,190 B2 | 1/2007 | Ye et al. |
| 7,336,941 B1 | 2/2008 | Clingerman et al. |
| 7,386,232 B1 | 6/2008 | Cauchy et al. |
| 7,600,031 B2 | 10/2009 | Toutonghi |
| 7,639,606 B2 | 12/2009 | Taylor et al. |
| 7,751,837 B2 | 7/2010 | Aaltonen et al. |
| 7,769,021 B1 | 8/2010 | Chen et al. |
| 7,839,766 B1 | 11/2010 | Gardner |
| 7,859,993 B1 | 12/2010 | Choudhury et al. |
| 7,861,002 B2 | 12/2010 | Puon et al. |
| 8,028,050 B2 | 9/2011 | Italiano et al. |
| 8,576,725 B2 | 11/2013 | Chavez et al. |
| 8,768,388 B2 * | 7/2014 | Berry .............. H04W 4/12 455/466 |
| 8,823,767 B2 * | 9/2014 | Varga ............... H04W 4/14 348/14.08 |
| 8,843,165 B2 * | 9/2014 | Beattie, Jr. ......... H04W 4/12 455/466 |
| 8,934,336 B2 * | 1/2015 | Ramachandran ..... H04W 76/18 370/221 |
| 9,204,269 B1 | 12/2015 | Cham et al. |
| 9,973,907 B1 | 5/2018 | Cham et al. |
| 10,419,899 B1 | 9/2019 | Cham et al. |
| 2002/0077131 A1 | 6/2002 | Mizell et al. |
| 2005/0021840 A1 | 1/2005 | Niemi |
| 2005/0222815 A1* | 10/2005 | Tolly .................. H04L 43/50 702/185 |
| 2006/0002291 A1 | 1/2006 | Alicherry et al. |
| 2006/0167849 A1 | 7/2006 | Marcus et al. |
| 2007/0147346 A1* | 6/2007 | Gilmartin ........... H04L 41/5022 370/352 |
| 2007/0183317 A1 | 8/2007 | Vasseur et al. |
| 2007/0226532 A1 | 9/2007 | Matsuda |
| 2007/0268817 A1 | 11/2007 | Smallegange et al. |
| 2008/0037553 A1* | 2/2008 | Gilmartin ............ H04L 41/082 370/395.41 |
| 2008/0052344 A1 | 2/2008 | Alecci et al. |
| 2009/0305729 A1 | 12/2009 | Bennett |
| 2010/0146133 A1 | 6/2010 | Perrin et al. |
| 2012/0236709 A1 | 9/2012 | Ramachandran et al. |
| 2012/0236823 A1 | 9/2012 | Kompella et al. |

OTHER PUBLICATIONS

Notice of Allowance dated Jul. 31, 2015 for U.S. Appl. No. 13/835,615, filed Mar. 15, 2013; 7 pages.
Non-Final Office Action dated Oct. 11, 2016 for U.S. Appl. No. 14/926,177, filed Oct. 29, 2015; 14 pages.
Final Office Action dated Jan. 30, 2017 for U.S. Appl. No. 14/926,177, filed Oct. 29, 2015; 17 pages.
Non-Final Office Action dated Jun. 8, 2017 for U.S. Appl. No. 14/926,177, filed Oct. 29, 2015; 18 pages.
Final Office Action dated Sep. 22, 2017 for U.S. Appl. No. 14/926,177, filed Oct. 29, 2015; 20 pages.
Notice of Allowance dated Jan. 11, 2018 for U.S. Appl. No. 14/926,177, filed Oct. 29, 2015; 8 pages.
Non-Final Office Action dated Jan. 18, 2019 for U.S. Appl. No. 15/947,284, filed Apr. 6, 2018; 11 pages.
Notice of Allowance dated May 1, 2019 for U.S. Appl. No. 15/947,284, filed Apr. 6, 2018; 11 pages.

* cited by examiner

RADIUS Accounting Request Trace for WiFi 700

Internet Protocol, Src: 10.10.10.100 (10.10.10.100), Dst: 20.20.20.200 (20.20.20.200)
User Datagram Protocol, Src Port: 36060 (36060), Dst Port: radius-acct (1813)
Radius Protocol
Code: Accounting-Request (4)
Packet identifier: 0x80 (128)
Length: 420
Authenticator: e8a1edfdea7de4bcdbb1a93944793431
[The response to this request is in frame 20]
Attribute Value Pairs
AVP: l=12 t=User-Name(1): 6316769816
AVP: l=6 t=NAS-IP-Address(4): 10.241.149.153
AVP: l=6 t=NAS-Port(5): 0
AVP: l=6 t=Service-Type (6): Outbound-User (5) ~702
AVP: l=6 t=Framed-IP-Address(8): 173.251.36.214
AVP: l=22 t=Called-Station-Id(30): 216.255.102.144:4500
AVP: l=12 t=Calling-Station-Id(31): 6316769816 (MDN) ~704
AVP: l=6 t=Acct-Status-Type(40): Start(1)
AVP: l=11 t=Acct-Session-Id(44): 3B34BAE1C
AVP: l=21 t=Tunnel-Client-Endpoint(66): 167.206.20.248:1170 (WAN IP Address) ~706
AVP: l=22 t=Tunnel-Server-Endpoint(67): 216.255.102.144:4500

FIG. 7A

RADIUS Accounting Request Trace for Cellular ⎽⎽708

Internet Protocol, Src: 10.10.10.100 (10.10.10.100), Dst: 20.20.20.200 (20.20.20.200)
User Datagram Protocol, Src Port: 32792 (32792), Dst Port: radius-acct (1813)
Radius Protocol
   Code: Accounting-Request (4)
   Packet identifier: 0x9b (155)
   Length: 286
   Authenticator: 95cbe5d55f954804f117287cb120b359
   [The response to this request is in frame 2]
   Attribute Value Pairs
     AVP: l=12 t=User-Name(1): 6316769838
     AVP: l=6 t=NAS-IP-Address(4): 167.206.20.156
     AVP: l=6 t=NAS-Port(5): 41117
     AVP: l=6 t=Service-Type(6): Framed (2) ⌒710
     AVP: l=6 t=Framed-IP-Address(8): 69.74.196.254
     AVP: l=6 t=Framed-IP-Netmask (9): 255.255.255.255
     AVP: l=6 t=Framed-MTU(12): 1500
     AVP: l=12 t=Vendor-Specific(26) v=Starent (8164)
     AVP: l=12 t=Calling-Station-Id (31): 6316769838 (MDN) ⌒712

FIG. 7B

METHOD FOR SMS SERVICE CONTINUITY, NETWORK PREFERENCE, AND REPORTING LOGIC

CROSS-REFERENCE TO RELATED APPLICATION

This application is a continuation of U.S. Nonprovisional applications Ser. No. 15/947,284, "Service Continuity, Network Preference, and Reporting Logic with SMS Services," filed Apr. 6, 2018, which claims priority from U.S. Nonprovisional application Ser. No. 14/926,177, "Method and System for Service Continuity, Network Preference, and Reporting Logic with SMS Services," filed Oct. 29, 2015, which claims priority from U.S. Nonprovisional application Ser. No. 13/835,615, "Method and System for Service Continuity, Network Preference, and Reporting Logic with SMS Service," filed Mar. 15, 2013, which claims the benefit of U.S. Provisional Application No. 61/667,348, "Method and System for Originating and Terminating SMS Message Using IP Network," filed Jul. 2, 2012, all of which are incorporated herein by reference in their entireties.

FIELD

Embodiments relate to originating and terminating SMS messages using cellular networks and IP networks.

BACKGROUND

Short message services (SMS) were initially originated and delivered only by cellular networks by taking advantage of underutilized bandwidth of cellular voice networks. In particular, a mobile device connected to a cellular network has been able to send SMS messages to another mobile device only when connected to a cellular network. However, cellular networks have become overburdened with the vast number of SMS messages sent and received. In addition, there are occasions when sending an SMS message using cellular networks is less than desirable due to unavailability of the network and/or cost. Thus, there are strong incentives to offload SMS onto other networks.

What is needed is a system and method for providing SMS over networks other than cellular networks.

BRIEF SUMMARY

Embodiments herein describe methods and systems for originating and terminating SMS messages using IP networks.

According to some embodiments, a method includes attempting delivery of a short message service (SMS) message on a first network a first predetermined number of times according to a first predetermined time schedule. The method further includes attempting delivery of the SMS message on a second network after a failure to deliver the SMS message on the first network. In addition, the method includes reattempting delivery of the SMS message on the first network followed by reattempting delivery of the SMS message on the second network, according to a second predetermined time schedule.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The accompanying drawings, which are incorporated herein and form a part of the specification, illustrate embodiments of the present invention and, together with the description, further serve to explain the principles of the invention and to enable a person skilled in the pertinent art to make and use the invention.

FIG. 7A illustrates a RADIUS accounting request trace for wireless according to example embodiments.

FIG. 7B illustrates a RADIUS accounting request trace for cellular according to example embodiments.

DETAILED DESCRIPTION

Figure 1:
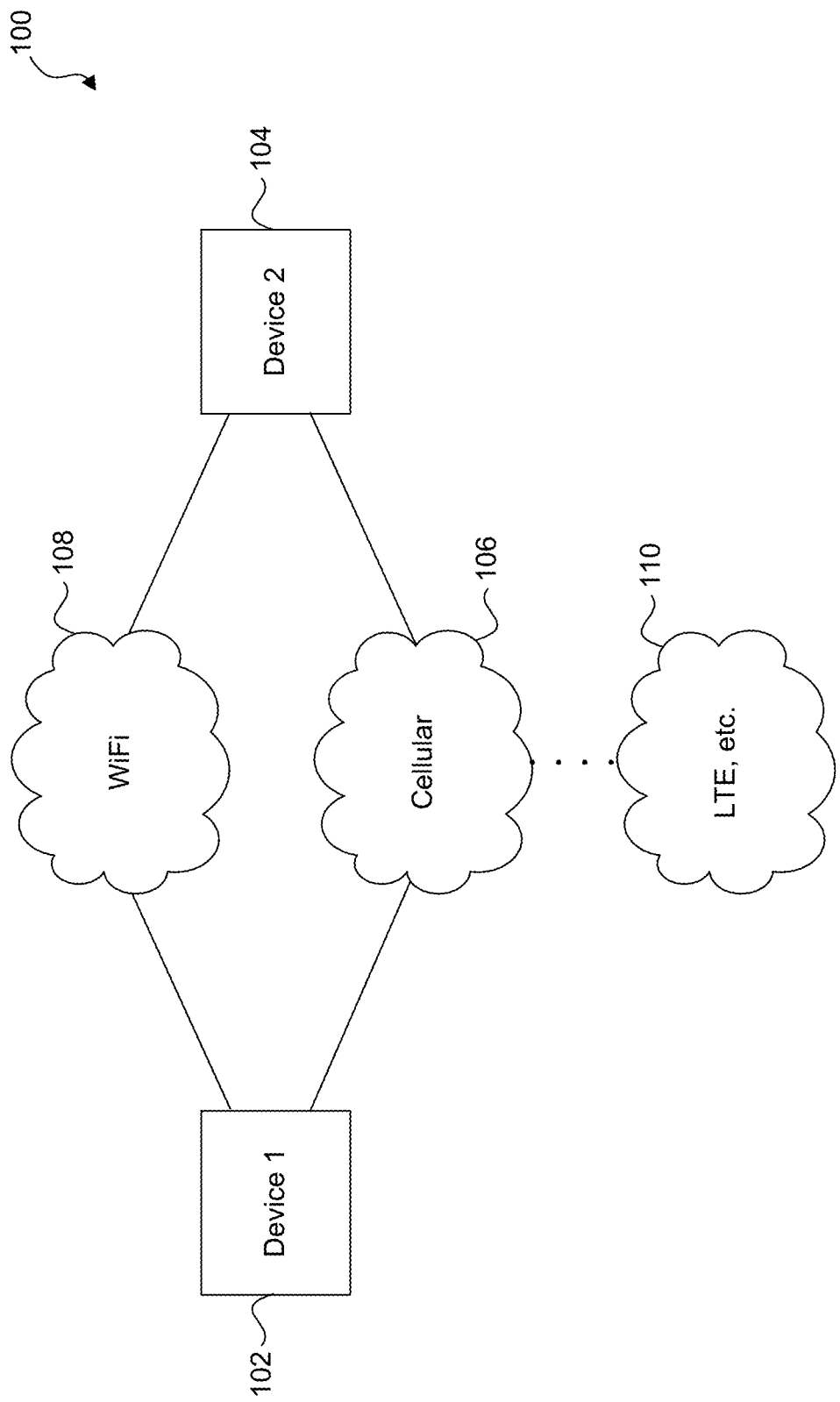
FIG. 1 illustrates a network environment according to example embodiments.

While the present invention is described herein with reference to the illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

History of SMS

Originally, SMS was designed to be sent and received by a cellular network. However, according to the advantages demonstrated in the example embodiments, it is desirable to offload SMS from cellular networks to IP networks such as WiFi networks and LTE (Long Term Evolution) networks.

SMS is a text-based messaging service that uses communication protocols to exchange messages from one communication device, such as a mobile telephone, to another communication device. SMS was originally defined in the Global System for Mobile Communications (GSM) standards in 1985, and has been expanded to operate with Code Division Multiple Access (CDMA) networks and even landline telephones. SMS was originally designed as a way to make use of under-utilized bandwidth of cellular networks in an effort to increase profitability by making use of less-used higher frequency bands. SMS was first developed to be sent over circuit-switched wireless voice and data cellular networks. As cellular networks transitioned to provide circuit-switched voice networks as well as packet-switched data networks, and packet-switched voice and data networks, SMS also has taken advantage of improved data capabilities. SMS has boomed in popularity since its introduction and now SMS is widely used in the United States and throughout the world to allow users to communicate messages up to 160 characters in length. However, SMS is not limited to communication of up to 160 characters, and may be used to communicate more than 160 characters.

Although originally underutilized, SMS usage has now reached the point where it requires a large amount of bandwidth by cellular networks. In addition, in many locations, such as basements of buildings, cellular service may be lacking, but yet Wi-Fi may be available. Furthermore, a mobile device may be connected to a Wi-Fi network, yet roaming on another cellular network provider's network either domestically or internationally. There are many other exemplary situations where the cost of sending an SMS message using a cellular network may be prohibitive. Thus, there are many reasons why it may be desirable to offload SMS services onto other available networks. According to example embodiments, a short message service center (SMSC) may provide fixed-mobile convergence, allowing a user agent to receive or transmit SMS messages using two or more networks.

Network Environment

FIG. 1 is a diagram of an environment 100 for originating and terminating SMS messages according to example embodiments. Two devices, Device 1 102 and Device 2 104 may be connected to one or more networks including a cellular network 106, an IP network such as a WiFi network 108, and even other networks such as a Long Term Evolution (LTE) network 110. However, these networks are exemplary, and Device 1 102 and Device 2 104 may be connected to other networks which may be capable of being used to originate and terminate SMS messages.

User Agent Registration

Figure 2:
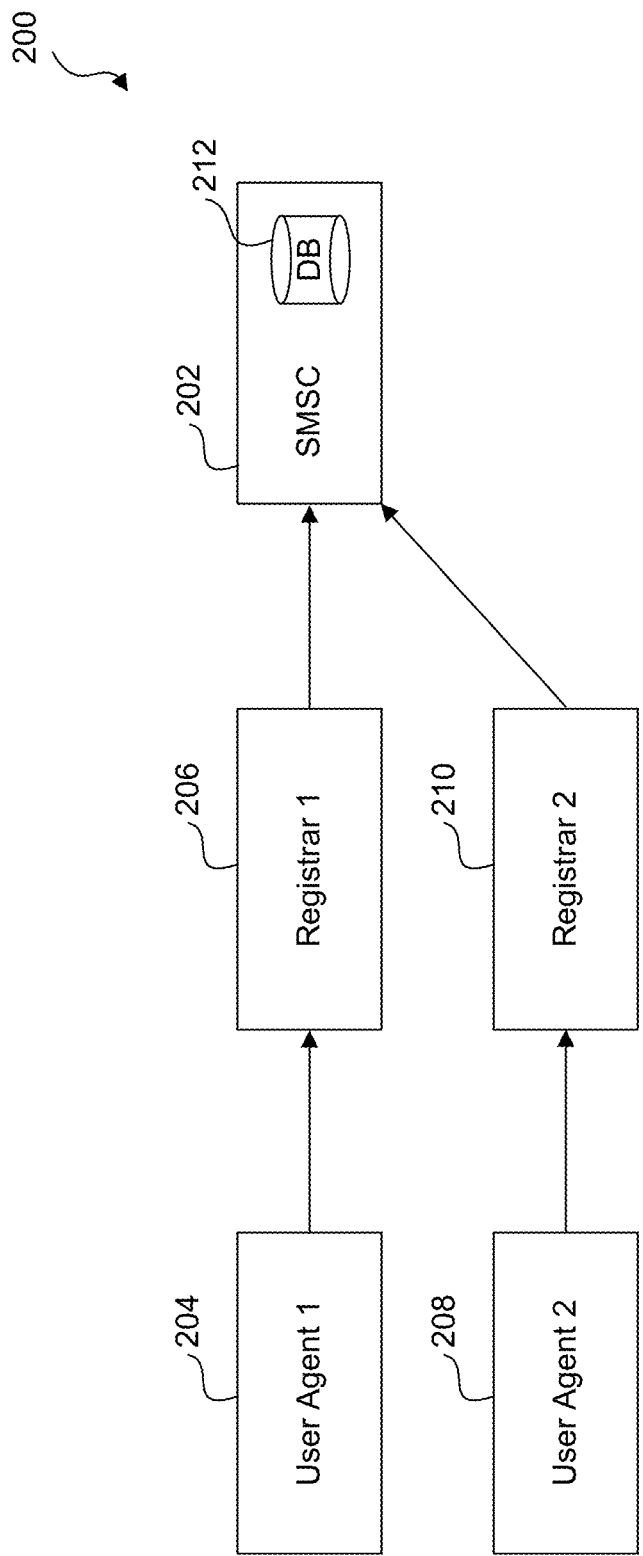
FIG. 2 illustrates device registration with a short message service center (SMSC) according to example embodiments.

FIG. 2 shows user agent registration 200 with an SMSC 202 according to example embodiments. As shown in FIG. 2, two example user agents may register with a SMSC 202. A User Agent 1 204 may be found on Device 1 102 and may have two IP addresses which are allocated, a first IP address from cellular network 106 and a second IP address from WiFi network 108. User Agent 1 204 may establish and maintain a secure connection such as VPN (virtual private network), TLS (transport security layer), etc. on the WiFi network 108 and send a SIP register to SIP registar 1 206 in order to register with a SIP IP network to send/receive SMS messages over WiFi network 108. The registrar 1 206 may then forward registration information to SMSC 202 to register User Agent 1 204 on WiFi network 108. User Agent 1 204 may also perform a similar SIP registration on cellular network 106. SMSC 202 stores registration data in a database 212 having subscriber profiles. The database 212 may be located either within SMSC 202 or at a remote location. The subscriber profiles may include IP addresses of user agents, mobile directory numbers and other data. In a similar manner, User Agent 2 208 may establish and maintain a VPN tunnel on the WiFi network 108 and send a SIP register to SIP registar 2 210 in order to send/receive SMS messages over WiFi network 108. The registrar 2 210 may then forward registration information to SMSC 202 to register User Agent 2 208 on WiFi network 108. User Agent 2 208 may also perform a similar SIP registration on cellular network 106.

Thus, a SIP gateway may maintain a SIP third party registration database. As an example, SIP third party registration messages are maintained in an IP Multimedia Subsystem (IMS) registration service/database of SMSC 202, such as database 212.

Mobile Origination

Figure 3:
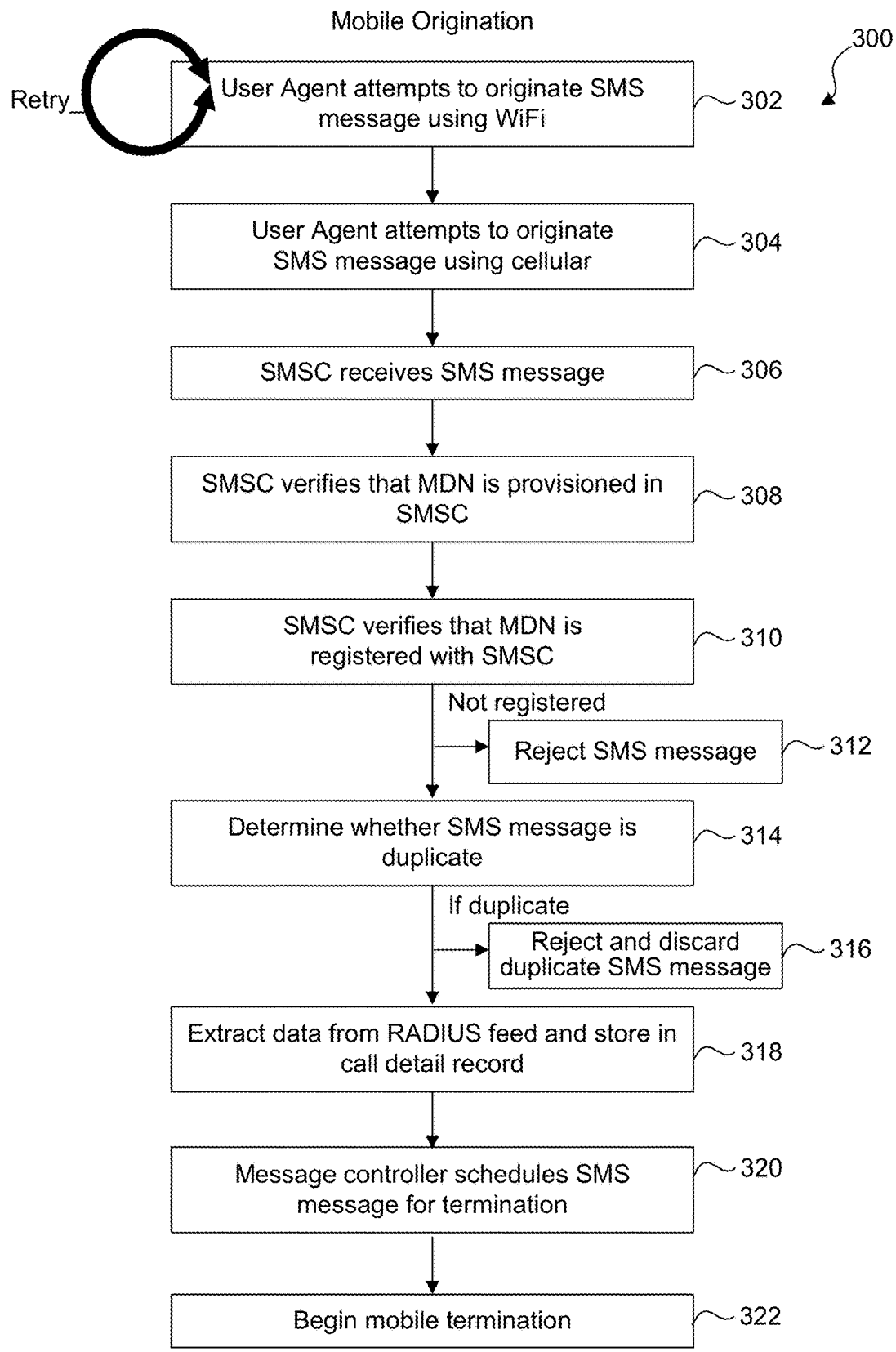
FIG. 3 illustrates a flow chart of mobile origination according to example embodiments.

FIG. 3 illustrates a method 300 for mobile origination of an SMS message by User Agent 1 204 according to example embodiments. As an example, User Agent 1 204 may be connected to both a WiFi network and a cellular network and have allocated both a first IP address for the WiFi network and a second IP address for the cellular network. The User Agent 1 204 establishes and maintains a VPN tunnel to communicate SIP based transactions. Thus, according to example embodiments, User Agent 1 204 sets up a VPN, registers with a SIP network, and then prefers to utilize the VPN for voice and SMS services.

As noted above, according to example embodiments, User Agent 1 204 prefers originating an SMS message using an IP network such as WiFi. Thus, in step 302, User Agent 1 204 attempts to originate the SMS message using WiFi.

As discussed in detail below in the context of termination, when connected to a WiFi network, User Agent 1 204 may retry sending the SMS message. In other words, the User Agent 1 204 may reattempt origination of the SMS message based on Non-Invite SIP transaction logic disclosed in RFC (request for comments) 3261 when the user agent does not receive a SIP 200 OK message. In addition, the user agent may handover SMS origination from the WiFi network to the cellular network if origination was unsuccessful after a pre-defined number of attempts.

If the WiFi network is unavailable or the User Agent 1 204 does not receive an acknowledgement, then in step 304, User Agent 1 204 may attempt to originate the SMS message using the cellular network.

In step 306, SMSC 202 receives the SMS message from either the cellular network or the WiFi network. In step 308, the SMSC 202 verifies that the mobile directory number of the originating User Agent 1 204 is provisioned in the SMSC 202. SMSC 202 executes this verification by analyzing the mobile directory number that is received in a SIP Request URI that is within the SMS message. If the User Agent 1 204 is provisioned in the SMSC 202, then in step 310, the SMSC 202 verifies that the mobile directory number is registered. However, if the User Agent 1 204 is not registered in the network utilized to originate the SMS message, then the SMSC 202 rejects the SMS message in step 312. Next, in step 314, the SMSC 202 determines whether the SMS message is a duplicate SMS message. A duplicate SMS message may be sent to the SMSC 202 according to three different scenarios.

In a first scenario, a first SMS message may be originated using an IP network by User Agent 1 204. However, an acknowledgement may not be received by User Agent 1 204 connected to the IP network and User Agent 1 204 may originate a second SMS message. The SMSC 202 may identify a duplicate SMS message by utilizing the message Call-ID for the mobile directory number and discard the duplicate message. In a second scenario, a first SMS message may be originated using a cellular network by User Agent 1 204. However, an acknowledgement, e.g., SMDPP ACK (small message delivery point-point to point), may not be received by User Agent 1 204 connected to the cellular network and User Agent 1 204 may try to re-originate the SMS message on the secondary network. The SMSC 202 may identify a duplicate SMS message by utilizing a message transaction ID of a particular teleservice layer for the mobile directory number and discard the duplicate message. In a third scenario, a mobile originating device may originate an SMS message using a WiFi network, but may not receive an acknowledgement. Thus, the mobile originating device may then originate the same SMS message using a cellular network after a predefined retry time-out on the WiFi network. If the SMSC 202 receives two SMS messages, one from the WiFi network and one from the cellular network, then the SMSC 202 may identify the duplicate SMS message by utilizing the message Call-ID embedded in the SMS message. The mobile originating device utilizes the same message Call-ID when re-originating the SMS message using the cellular network. Thus, the SMSC 202 may compare the message Call-ID of the second message with the message Call-ID received on the Wi-Fi network for the mobile directory number and discard the duplicate message.

If the SMS message is found to be a duplicate by SMSC 202, then in step 316 the SMS message is rejected and discarded. Although this duplicate logic is shown here as being applied during SMS origination, it is also applicable to SMS termination, which is discussed below. However, the duplication logic is applied by SMSC 202 for SMS origination, whereas the duplication logic is applied by a user agent, such as user agent 208 for SMS termination.

In step 318, the SMSC 202 may extract data from active RADIUS records and store data regarding the SMS message in a call detail record. This is discussed further below. In step 320, a message controller schedules the SMS message to be terminated to the URI originally received in a SIP registration for the recipient by storing the SMS message in the realtime cache. In step 322, the SMSC 202 may begin mobile termination.

Mobile Termination

Figure 4:
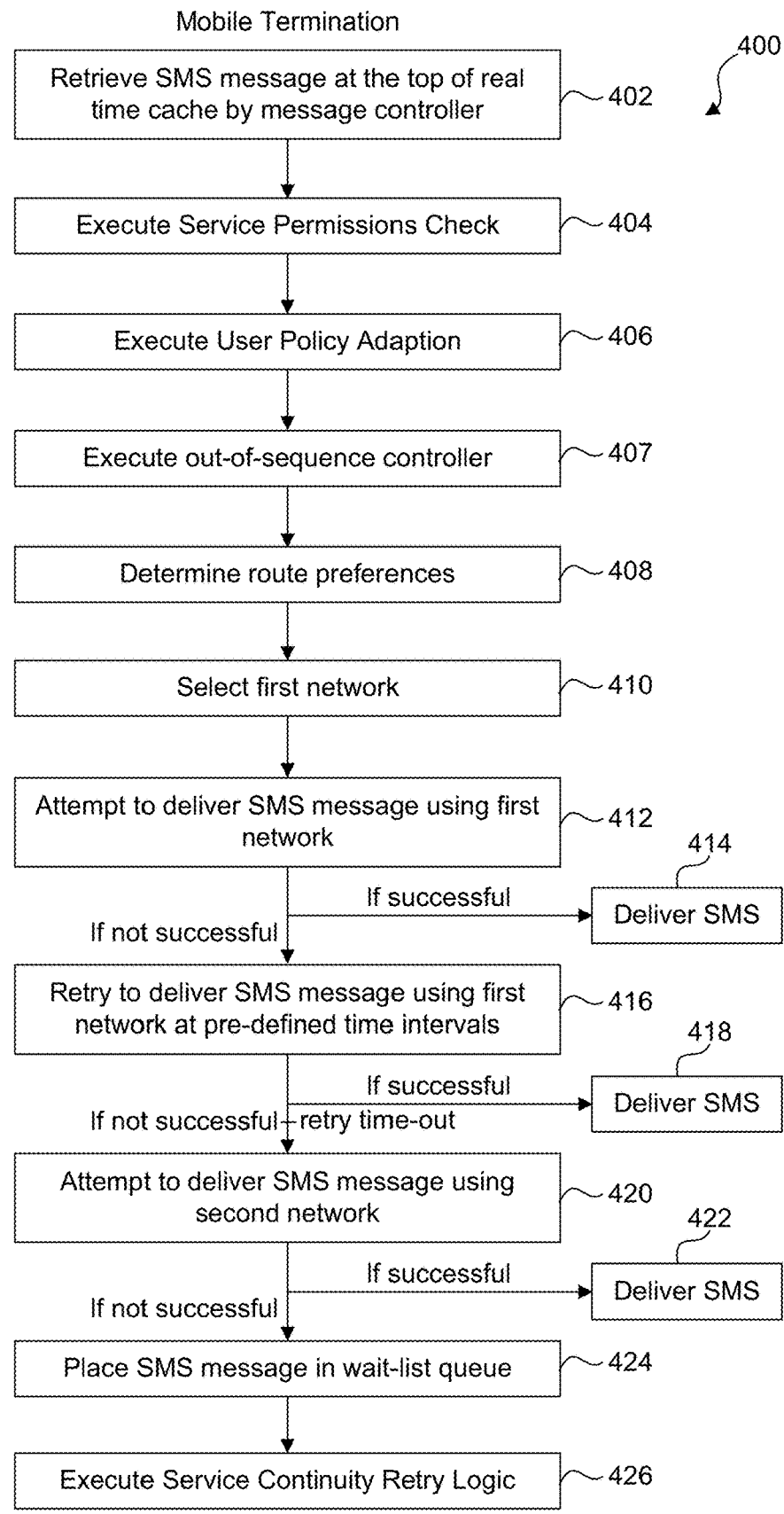
FIG. 4 illustrates a flow chart of mobile termination according to example embodiments.

FIG. 4 illustrates mobile termination of an SMS message 400 to User Agent 2 208 according to example embodiments. The mobile termination of the SMS message begins in step 402. Mobile termination includes sending each SMS message in the realtime cache one at a time, according to a FIFO mechanism. Thus, the SMSC 202 may send a next SMS message once a successful acknowledgement is received for an earlier sent message. If the SMSC 202 receives a new SMS message, the SMSC 202 will determine whether any SMS messages are in a waitlist queue (which is discussed below), and attempt to terminate the messages in the waitlist queue first by moving the messages in sequence to the realtime cache. Thus, the SMSC 202 is able to manage out-of-sequence issues. The SMSC 202 is able to deliver messages pending in the realtime cache before delivering messages in the waitlist queue. This is known as an out-of-sequence controller.

Thus, in step 402, an SMS message may be retrieved from the front of the realtime cache. When the SMS message arrives at the SMSC 202, a message controller queries a routing service to determine primary and secondary routes that are configured for a terminating mobile directory number. First, in step 404, the SMSC 202 may execute a service permissions check to determine whether the User Agent 2 208 belongs to a network operator, is provisioned in the SMSC 202 and allowed to be served by the SMSC 202. The SMSC 202 may query an internal provisioning database or an external database such as a Home Subscriber Server (HSS). Next, in step 406, SMSC 202 may execute a user policy adaption check to determine allowable terminating policies including whether User Agent 2 208 is allowed to receive inter-carrier messages, receive messages in international destinations, receive shortcodes, belong to subscription programs, or is allowed personalized features such as messaging forwarding, permanent message storing, etc. In step 407, the out-of-sequence controller is executed in order to manage out-of-sequence issues. Next, in step 408, SMSC 202 may determine SMS message routing preferences for User Agent 2 208. According to example embodiments, User Agent 2 208 may prefer to have SMS messages delivered over a WiFi network as a primary network, and a circuit switching cellular network as a secondary network. However, the routing preferences may also be configured to have User Agent 2 208 prefer other networks such as LTE, 3G, WiFi, or cellular (circuit switching, GSM or CDMA, etc.). In step 410, SMSC may begin SMS message termination to deliver the SMS message to User Agent 2 208 using the WiFi network by having the message controller forward the SMS message to the SIP/IP Gateway. In step 412, SMSC may attempt a first attempt to deliver the SMS message using the WiFi network. The SMSC 202 may attempt to send the SMS message if the SIP gateway has a valid IP registration record for the mobile terminated number. If there is a valid registration record, the SIP Gateway delivers the message to a registered contact URI which was received during registration. In addition, a registration check to query a HSS for location or registration information for a corresponding registrar where the user agent is registered may occur. The user agent is configured to send frequent SIP re-registrations on a frequent basis in order to keep the user agent IP alive. The SIP registrar may have a mechanism to force network-based de-registration when a user agent fails to update registration status with the SIP registrar. Upon de-registration, the SMSC 202 may unbind the active IP registration.

In step 414, if the SMS message is successfully delivered to User Agent 2 208, then the mobile termination 400 is complete. SMSC 202 expects to receive a successful acknowledgement such as a 200 OK when terminating the SMS message. However, in step 416, if no acknowledgement is received or if the SMS message is not successfully delivered to User Agent 2 208, then the mobile termination 400 continues. The SMS message delivery may fail for a number of reasons. As an example, there may be intermittent availability of the WiFi network, or there may be rapid mobility of Device 2 104 thereby causing sporadic registrations. There also may be low radio signaling strength indication which affects SMS services. In addition, there may be packet loss or frame loss causing SMS message delivery failure. However, reasons for SMS message delivery failure are not limited to these reasons.

In step 416, SMSC 202 may retry to deliver the SMS message using the WiFi network according to example embodiments. SMSC 202 may utilize an increasing back-off interval between retry delivery attempts. As an example, SMSC 202 may use a retry process based on RFC 3261 which provides a retry mechanism on SIP which is shown in the table below.

| SMS Delivery Attempt | Timer (Back-Off Timer) | Total Time |
| --- | --- | --- |
| First | 0 seconds | 0 seconds |
| Second | T1 | 0.5 seconds |
| Third | 1 second | 1.5 seconds |
| Fourth | 2 seconds | 2.5 seconds |
| Fifth | T2 | 4.5 seconds |
| Sixth | T2 | 8.5 seconds |
| Seventh | T2 | 12.5 seconds |
| Eighth | T2 | 16.5 seconds |
| Ninth | T2 | 20.5 seconds |
| Tenth | T2 | 24.5 seconds |
| Eleventh | T2 | 28.5 seconds |
| Time Out | Fail | 32 seconds |

Thus, according to RFC 3261, if the SMSC 202 T1 timer is set to a default value of 500 ms, then there will be 11 transmission attempts per SMS message. T2 is equal to 4 seconds and failure occurs at T1*64. If the SMS message is successfully delivered during the retry process in step 416, then the mobile termination 400 ends in step 418. If a new SMS message is received during the transmission attempts, then the SMSC 202 may place the new message for termination in the realtime cache. In addition, if the SMS message is delivered or a time out occurs, the SMSC may check the realtime cache for pending messages. Upon time out, the SMSC 202 may move a pointer of the failed SMS message to refer to a first position of the wait list queue. This helps to address out of sequence issues.

If the SMS message may not be delivered using the WiFi network for whatever reason, in step 420, SMSC 202 may attempt to deliver the SMS message to User Agent 2 208 using a second network connection, such as cellular. The SMSC 202 may have a cached serving mobile switching center (MSC) address for the mobile directory number or may query an HLR for a serving MSC address for that mobile directory number. The SMSC 202 may maintain the serving MSC address for a configurable time period unless updated by the HLR with the new serving location of the MDN. However, if the User Agent 2 208 moves away from a MSC that it was previously registered with, then the SMSC will query the HLR for a new MSC. In step 422, if the SMSC 202 is able to deliver the SMS message to User Agent 2 208 using the second network connection, then the mobile termination 400 is complete. However, in step 424, if the SMS message is not successfully delivered to User Agent 2 208 using the cellular network, then the mobile termination 400 continues. In step 426, SMSC 202 places the SMS message at the end of a waitlist queue. In step 426, SMSC 202 begins service continuity retry logic which is shown in detail in FIG. 5.

Service Continuity Retry Logic

Figure 5:
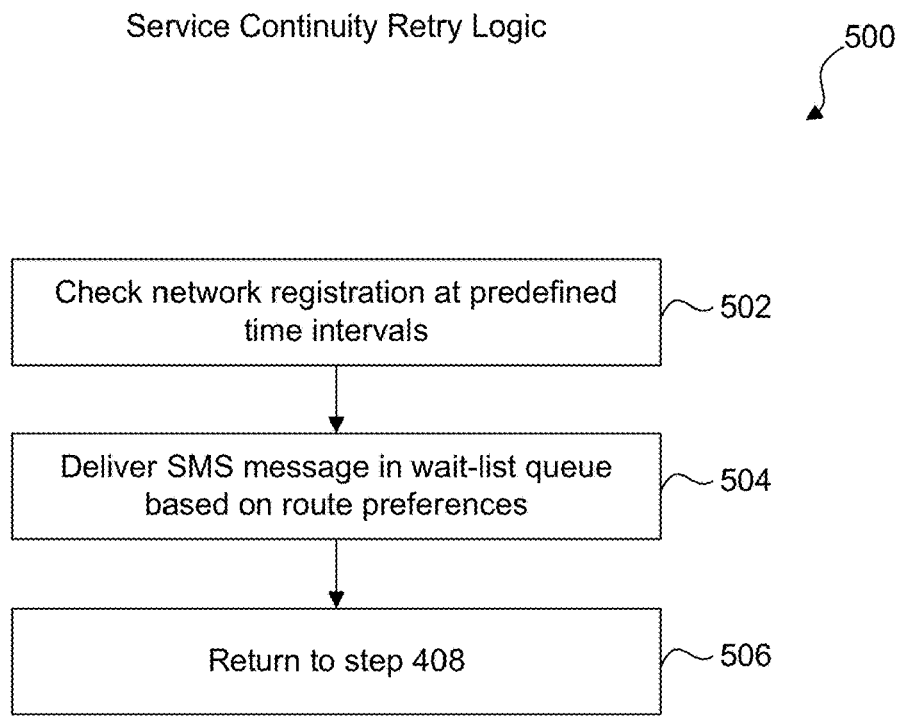
FIG. 5 illustrates a flow chart of service continuity retry logic according to example embodiments.

FIG. 5 illustrates service continuity retry logic 500 according to example embodiments. SMSC 202 reattempts delivery of an SMS message at the front of the waitlist queue.

In step 502, SMSC 202 checks network registration of User Agent 2 208 at predefined intervals. As an example, SMSC 202 may check both WiFi and cellular network registration of User Agent 2 208. As an example, SMSC 202 may check for network registration according to the following timetable: 30 seconds, 60 seconds, 2 minutes, 5 minutes, 10 minutes, 30 minutes, and every two hours afterwards. However, this timetable is merely exemplary and the timetable is not limited to these time intervals.

For instance, the SMSC 202 may execute an IP registration check before every retry attempt on the cellular network. Further, if the SMSC 202 receives a new registration from either the WiFi or cellular network, then the SMSC 202 may terminate its service continuity retry logic and deliver the SMS message on the most recently available network, but prefer utilizing WiFi.

If a new registration arrives from the WiFi network, then SMSC 202 may attempt delivery of the SMS message in the waitlist queue using the WiFi network. Thereafter, SMSC 202 may try to deliver the message to the cellular network after being informed by the HLR of the location of the serving MSC. A request for location information of the serving MSC is part of an earlier query performed toward the HLR to identify servicing MSC as part of service continuity logic. In certain cases, the MSC can inform SMSC 202 of a new location of the user. For example, this may occur in step 420 in FIG. 4.

If a user agent becomes available on the IP network, and the SMSC 202 receives a location notification from HLR, then the SMSC 202 may continue to terminate SMS on the preferred network and not react to HLR notifications. If a cellular registration notification arrives prior to a WiFi (or IP) registration notification, then the SMSC 202 may wait a configurable period until registration arrives on the IP network in order to prefer delivery of the SMS for WiFi. This may cause performance issues, so a wait flag may be operator configurable.

If SMSC 202 receives a new registration from either the WiFi or cellular network, then in step 504, SMSC 202 may deliver the SMS message based on the routing preferences for User Agent 2 208. Next, as provided in step 506, the service continuity retry logic loops and goes back to step 408 in FIG. 4 and executes as illustrated in the flowchart in FIG. 4 according to steps 410-426. Thus, according to example embodiments, if there is a registration on the primary or WiFi network, then the SMSC 202 may attempt delivery of the SMS message on the WiFi network.

If a second originating SMS message arrives for a same terminating user agent while the SMSC 202 is executing service continuity retry logic on a first SMS message for the user, then the second message is placed in the waitlist queue. This assists in eliminating out of sequence issues.

It may be possible that an SMS message may become "stuck" in either the waitlist queue or the realtime cache as a result of termination failures. For example, if a Wireless Enhanced Messaging Teleservice (WEMT) message is found to be not acceptable by the MSC, then the MSC may respond to the SMSC 202 with a "Teleservice ID not acceptable" message. If the SMS message does become "stuck," then the SMSC 202 should discard the SMS message and continue to deliver messages in the realtime cache and the waitlist queue.

SMS Reporting

According to further embodiments, it may be possible to record SMS service origination and termination network utilization. Thus, it may be possible to determine SMS traffic patterns, e.g., which cellular and WiFi networks are utilized to send and receive SMS messages.

Figure 6:
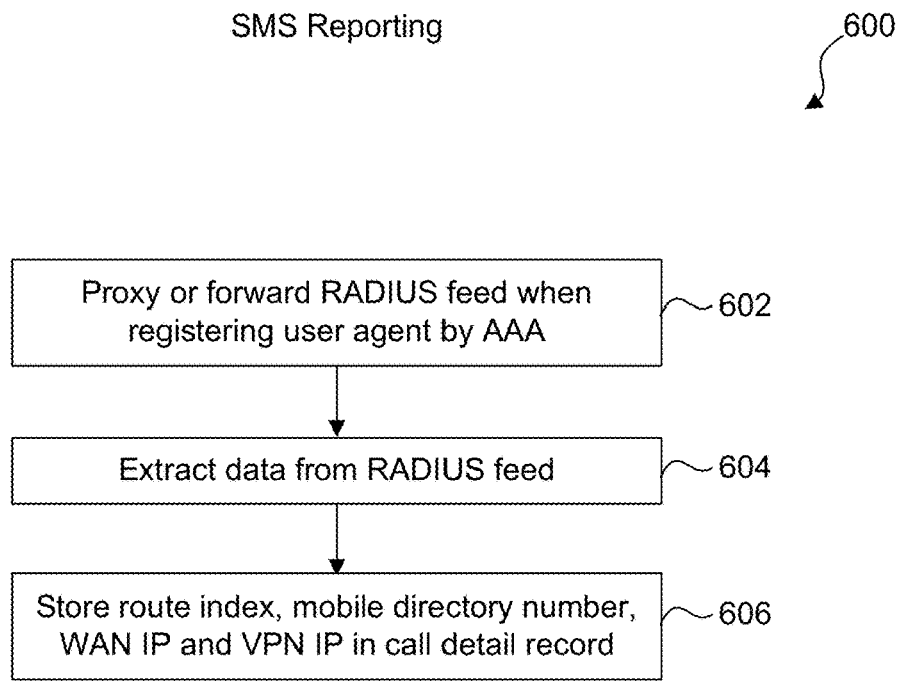
FIG. 6 illustrates SMS reporting according to example embodiments.

FIG. 6 illustrates SMS reporting 600 according to example embodiments. As shown in step 602, SMSC 202 may receive RADIUS feeds which are either proxied by an Authentication, Authorization and Accounting (AAA) server or forwarded when user agents register with networks. The AAA server may proxy RADIUS feeds when the user agent is IP registered and both RADIUS START and STOP records may be forwarded. In step 604, SMSC 202 may extract certain data from the RADIUS feed and in step 606, SMSC 202 may store this data in a call detail record. As an example, the SMSC may store a route index, a mobile directory number, a WAN IP and a VPN IP in a call detail record in an SMSC database. Use of these attributes may allow determination of SMS traffic patterns on WiFi (IP) and cellular networks.

A route index may specify a specific route path or interface used by an SMS message. As an example, a 3G cellular route ID may be "3", an LTE cellular route ID may be a "5" and a WiFi route ID may be a "7."

A mobile directory number (MDN) may provide a calling station ID and specify both a source and a destination. As an example, a mobile directory number may be "6315555555."

A WAN IP (Tunnel Client Endpoint) may be an originating subscriber WAN IP address of a source mobile directory number that successfully sent a mobile originated SMS or it may be a recipient subscriber WAN IP address of a destination mobile directory number for a successfully delivered mobile terminated SMS.

A VPN Tunnel IP may be an originating VPN client IP or it may be a terminating VPN client IP.

If a service type or a tunnel client endpoint is not provided if expected, the message will still be processed, but the call detail record will indicate both of these as "UNKNOWN."

The SMSC 202 may review the newest START RADIUS records based on three user agent attributes including timestamp, IP and MDN. The SMSC 202 may flush all records if a STOP record is received with the same IP and MDN. It may be possible for a second START record to arrive prior to a STOP record. If this occurs, the SMSC 202 may review the new START record and flush out the old START record. Any call detail records which are written for origination and termination may review the newest or second START record because that will indicate the delivery address of the SMS.

A sample call detail record is shown below.

| Column | Max Length (bytes) | Field Type | Description |
| --- | --- | --- | --- |
| Event ID | 14 | Integer | Unique identifier for CDR, broken into three distinct parts. The first 2 digits represent the service the CDR originated from. The final 12 digits are an incrementing numeric value. |
| Record Type | 2 | Integer | 1 - Mobile Terminated<br>2 - Mobile Originated<br>8 - International Mobile Terminate<br>9 - International Mobile Originate<br>12 - Premium CSC Debit<br>13 - Premium Local CSC Debit<br>14 - Premium CSC Credit |
| Calling Number | 20 | String | Source MDN. |
| Called Number | 20 | String | Destination MDN. |
| Source Route ID | 3 | Integer | Route ID of source MDN. |
| Destination Route ID | 3 | Integer | Route ID of destination MDN. |
| Submit Timestamp | 20 | Date/Time | Timestamp that message was received by the SMSC. Format is YYYY-MM-DD HH:MM:SS. |
| Delivery Timestamp | 20 | Date/Time | Timestamp that give message was delivered successfully. Format is YYY-MM-DD HH:MM:SS. |
| Message Length | 4 | Integer | Length of given message. |
| Priority | 1 | Boolean | Priority Indicator. |
| Price | 8 | Decimal | Rated price for CDR. Format is x.xx. |
| Provider ID | 2 | Integer | Unique identifier of content provider. Populated if CDR is associated with premium content, default value is 0. |
| Description | 100 | String | Description of given message. |
| Access Network | 10 | String | For SMS and MMS, will define whether or not the message was processed over the Cellular or Wi-Fi network. For SMS, this is determined by the SMSC, based on the source and destination route ID information. For MMS, this field will be populated by looking at the Service-Type AVP (6) of the subscriber's RADIUS record. Valid values are '2', '5', or ' '. If the Service-Type AVP is not provided in the RADIUS record, this field will be 'UNKNOWN'. For CSC, this field will be empty. |
| Service Endpoint | 40 | Decimal | For Cellular, will define the origination point code that the mobile originated message came from, or the point code that the mobile terminated message was successfully delivered to. For Wi-Fi, will define the IP address that the mobile originated message came from, or the IP address that the mobile terminated message was successfully delivered to. For CSC, this field will be empty. |
| Subscriber IP Address | 40 | Decimal | If an SMS or MMS message were processed using the Wi-Fi network, this field will be populated with the subscriber's IP address as defined in the Tunnel-Client-Endpoint AVP (66) of the subscriber's RADIUS record. If the SMS or MMS message was processed using the Cellular network, this field will be empty. For CSC, this field will also be empty. |

-continued

| Column | Max Length (bytes) | Field Type | Description |
|---|---|---|---|
| Service | 2 | Integer | Platform CDR originated from. Current valid values are:<br>SMS = 1<br>MMS = 2<br>CSC = 3 |

FIG. 7A illustrates an example RADIUS accounting request trace 700 for WiFi. As shown in FIG. 6, the RADIUS feed is forwarded to the SMSC 202, and specific data is extracted from the RADIUS feed in step 604 and stored in a database in step 606. The extracted data is highlighted in FIG. 7A. For instance, route index 702 is shown as "Outbound-User (5)." This indicates that the network is LTE. In addition, mobile directory number 704 is shown as "6316769816." WAN IP address 706 is shown as "167.206.20.248."

FIG. 7B illustrates an example RADIUS accounting request trace 708 for cellular. As shown in FIG. 6, the RADIUS feed is forwarded to the SMSC 202, and specific data is extracted from the RADIUS feed in step 604 and stored in a database in step 606. The extracted data is highlighted in FIG. 7B. For instance, route index 710 is shown as "Framed (2)." In addition, mobile directory number 712 is shown as "6316769838."

Figure 8:
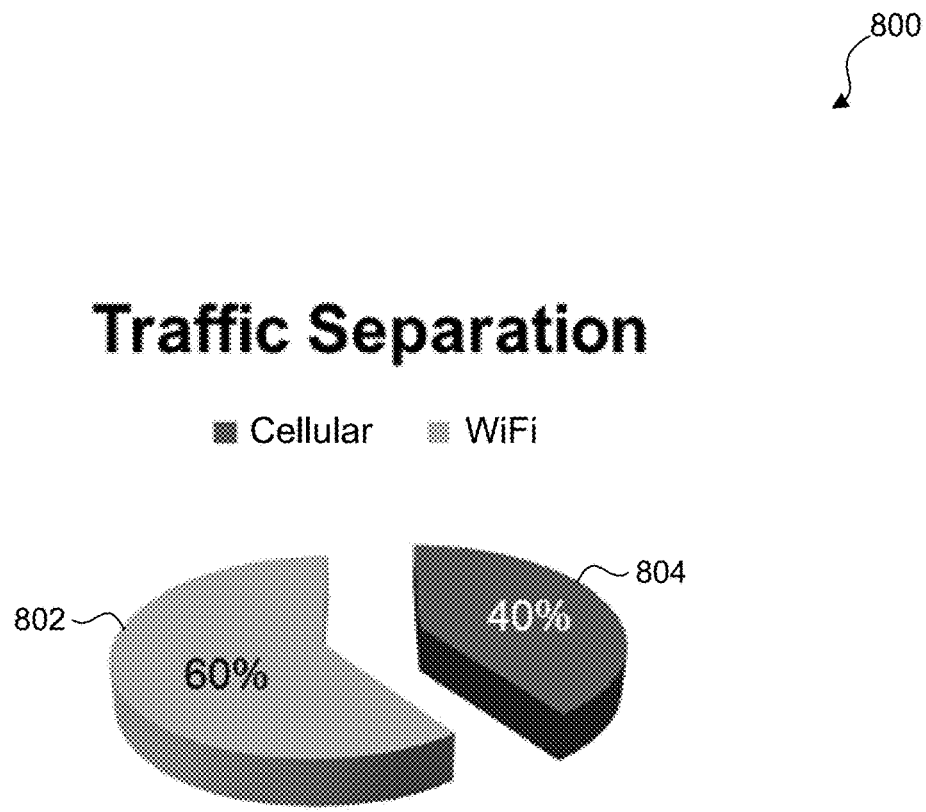
FIG. 8 illustrates a pie chart showing SMS traffic separation according to example embodiments.

As shown in FIG. 8, call detail record data may be used to determine what percentage of messages are originated/terminated using a cellular network and what percentage of messages are originated/terminated using Wi-Fi. FIG. 8 shows a traffic separation pie chart 800 that indicates that 40% of messages are originated/terminated using the cellular network 802 and 60% of messages are originated/terminated using Wi-Fi 804.

Figure 9:
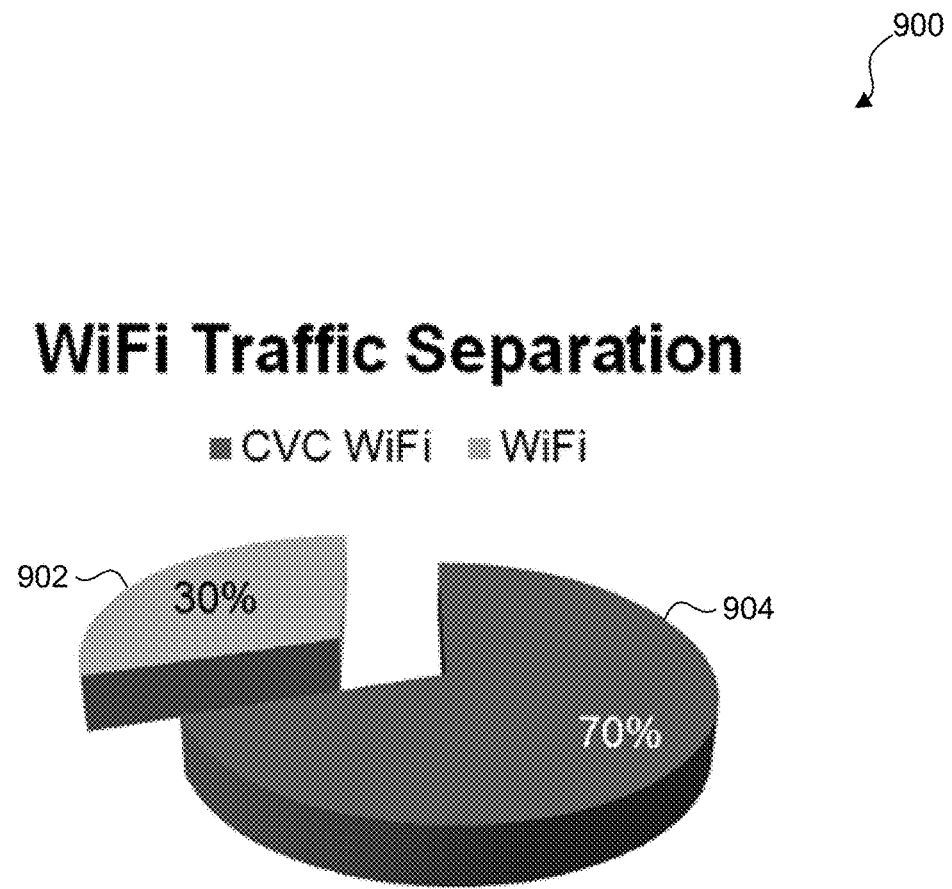
FIG. 9 illustrates a pie chart showing SMS wireless traffic separation according to example embodiments.

As shown in FIG. 9, call detail record data may be used to determine what percentage of messages that are originated/terminated using Wi-Fi are originated/terminated using Cablevision Wi-Fi and what percentage of messages are originated/terminated using third party Wi-Fi. FIG. 9 shows a WiFi traffic separation pie chart 900 that indicates that 70% of messages are originated/terminated using Cablevision Wi-Fi 902 and 30% of messages are originated/terminated using third party Wi-Fi 904.

SMS System Components and Example Computing Device

Figure 10:
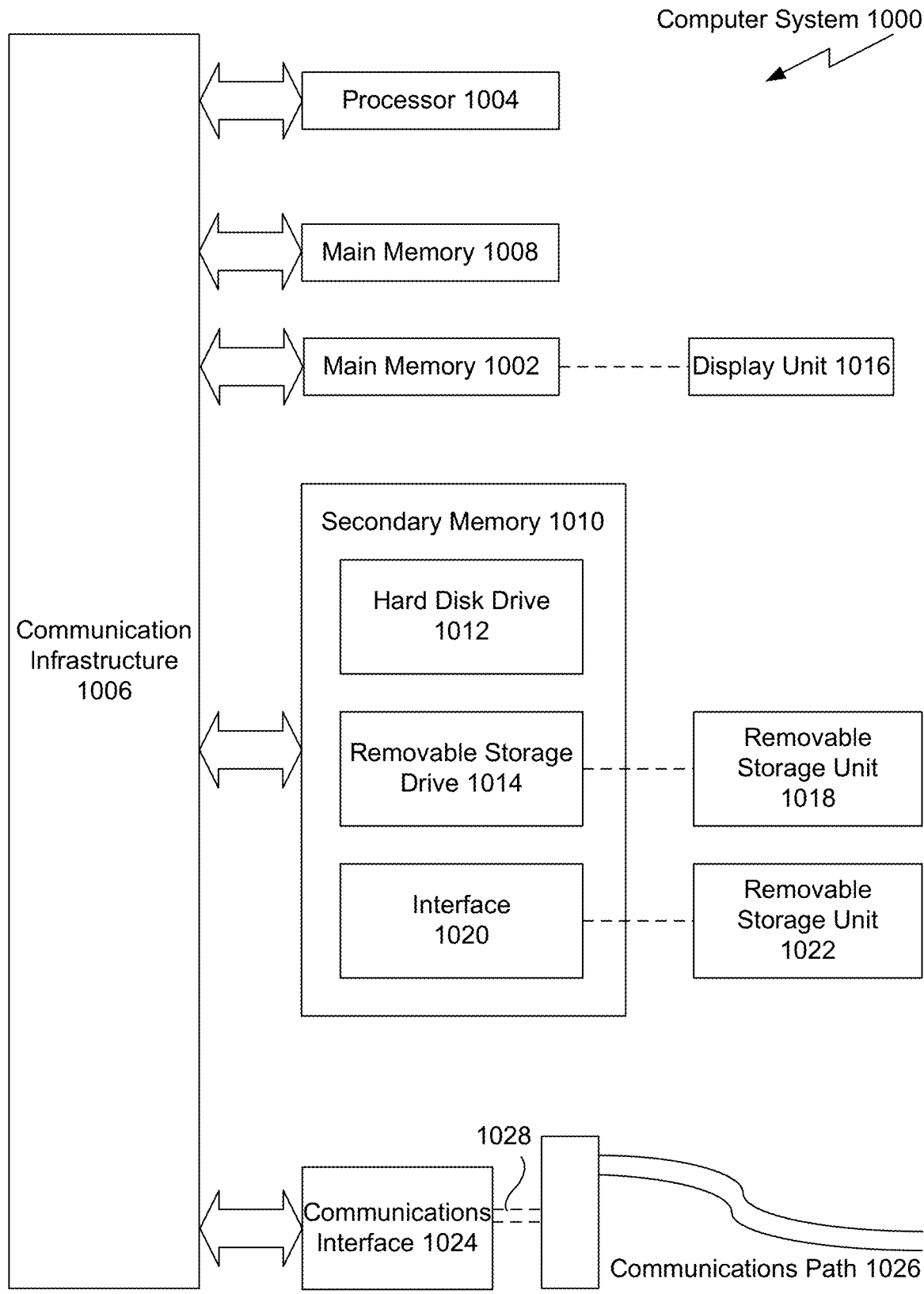
FIG. 10 is a diagram of an example computer system that can be used in embodiments.
Figure 11:
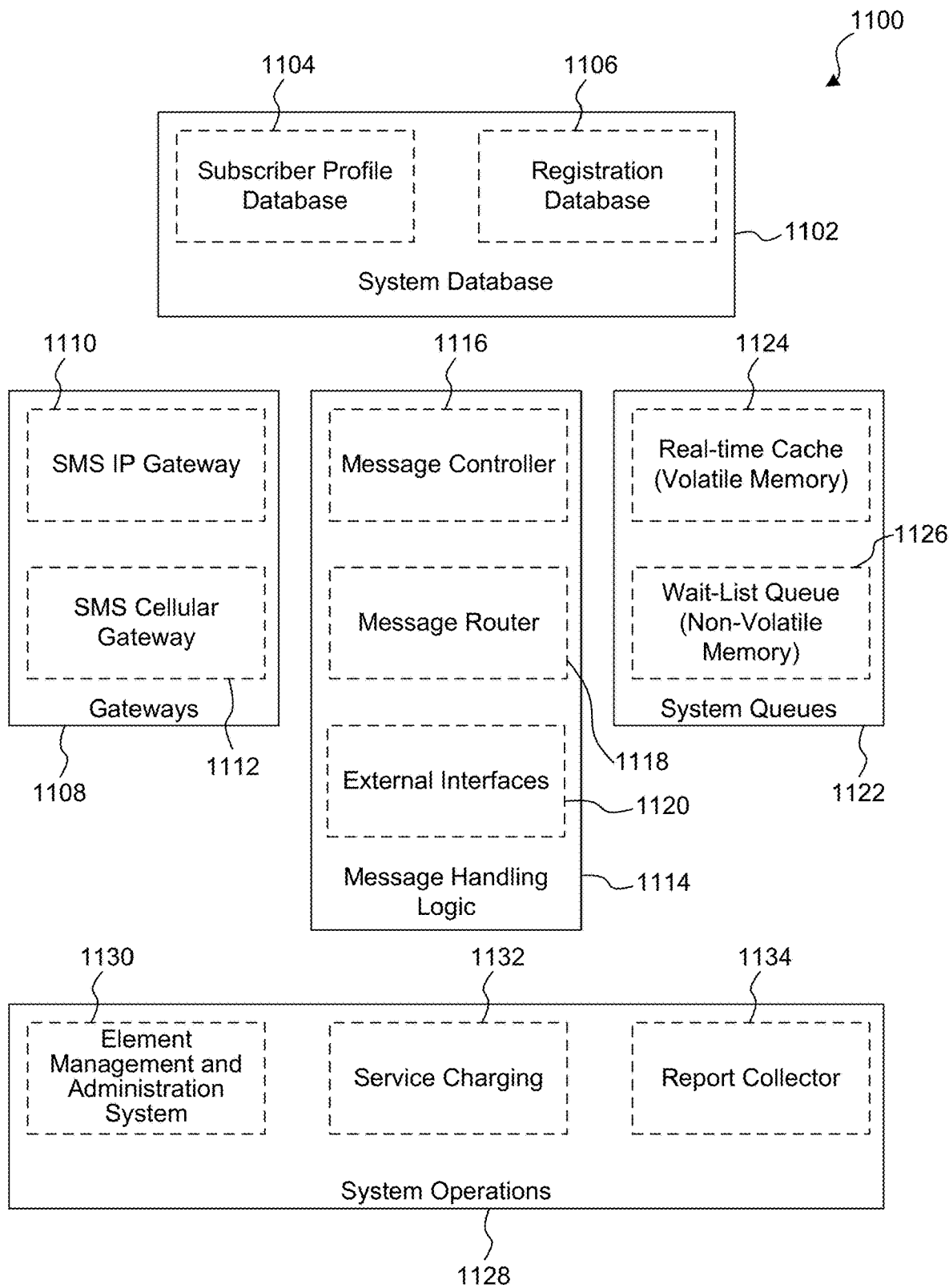
FIG. 11 illustrates a block diagram of components for originating and terminating SMS messages using cellular networks and IP networks, according to example embodiments.

FIG. 10 is a diagram of an example computer system that can be used in embodiments. FIG. 11 illustrates a block diagram 1100 of components for originating and terminating SMS messages using cellular networks and IP networks, according to example embodiments. According to example embodiments, the components described herein may include a system database 1102, which may include a subscriber profile database 1104 and a registration database 1106. In addition, the components may include gateways 1108, which may include an SMS IP Gateway 1110 and an SMS Cellular Gateway 1112. The components may further include message handling logic 1114, which may include a message controller 1116, a message router 1118, and external interfaces 1120. Additionally, the components may include system queues 1122, which may include a real-time cache (volatile memory) 1124 and a wait-list queue (non-volatile memory) 1126. Furthermore, the components may include system operations 1128 which may include element management and administration system 1130, service charging 1132, and report collector 1134.

In embodiments, the components of block diagram 1100 are used to implemented the various methods described herein. Furthermore, in an embodiment, the components of block diagram 1100 are implemented using example computing device 1000.

Various aspects of the example embodiments can be implemented by software, firmware, hardware, or a combination thereof. In addition, embodiments may be implemented as computer-readable code. Embodiments may be implemented via a set of programs running in parallel on multiple machines. For example, an SMSC carrying out mobile origination 300 and mobile termination 400 may be implemented in system 1000. Various embodiments of the invention are described in terms of this example system 1000.

Computer system 1000 includes one or more processors, such as processor 1004. Processor 1004 is connected to a communication infrastructure 1006 (for example, a bus or network).

Computer system 1000 also includes a main memory 1008, preferably random access memory (RAM), and may also include a secondary memory 1010. In accordance with implementations, user interface data may be stored, for example and without limitation, in main memory 1008. Secondary memory 1010 may include, for example, a hard disk drive and/or a removable storage drive. Removable storage drive 1014 may include a floppy disk drive, a magnetic tape drive, an optical disk drive, a flash memory, or the like. The removable storage drive 1014 reads from and/or writes to removable storage unit 1018 in a well-known manner. Removable storage unit 1018 may include a floppy disk, magnetic tape, optical disk, etc. which is read by and written to by removable storage drive 1014. As will be appreciated by persons skilled in the relevant art(s), removable storage unit 1018 includes a computer readable storage medium having stored therein computer software and/or data.

Computer system 1000 may also include a main memory 1002. Main memory 1002 may include, for example, cache, and/or static and/or dynamic RAM. Main memory 1002 may be separate from main memory 1008 or may be a part thereof. Main memory 1002 may be adapted to communicate with display unit 1016. Display unit 1016 may comprise a computer monitor or similar means for displaying graphics, text, and other data received from main memory 1002. In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Communications interface 1024 may include a modem, a network interface (such as an Ethernet card), a communications port, a PCMCIA slot and card, or the like. Software and data transferred via communications interface 1024 are in the form of signals which may be electronic, electromagnetic, optical, or other signals capable of being received by communications interface 1024. These signals are provided to communications interface 1024 via a communications path 1026. Communications path 1026 carries signals and may be implemented using wire or cable, fiber optics, a phone line, a cellular phone link, an RF link or other communications channels.

In this document, the term "computer readable storage medium" is used to generally refer to media such as removable storage unit 1018, removable storage unit 1022, and a hard disk installed in hard disk drive 1012. Computer readable storage medium can also refer to one or more memories, such as main memory 1008 and secondary memory 1010, which can be semiconductor memory (e.g., DRAMs, etc.). These computer program products are means for providing software to computer system 1000.

Computer programs (also called computer control logic) are stored in main memory 1008 and/or secondary memory 1010. Computer programs may also be received via communications interface 1024 and stored in main memory 1008 and/or secondary memory 1010. Such computer programs, when executed, enable computer system 1000 to implement the implementations as discussed herein. In particular, the computer programs, when executed, enable processor 1004 to implement the processes of the present disclosure, such as the steps in the methods discussed above. Accordingly, such computer programs represent controllers of the computer system 1000. Where implementations use software, the software may be stored in a computer program product and loaded into computer system 1000 using removable storage drive 1014, interface 1020, or hard drive 1012.

Embodiments may be directed to computer program products comprising software stored on any computer readable medium. Such software, when executed in one or more data processing device, causes a data processing device(s) to operate as described herein. Embodiments may employ any computer useable or readable medium. Examples of non-transitory computer readable storage media include, but are not limited to, primary storage devices (e.g., any type of random access memory), and secondary storage devices (e.g., hard drives, floppy disks, CD ROMS, ZIP disks, tapes, magnetic storage devices, and optical storage devices, MEMS, nano-technological storage devices, etc.). Other computer readable media include communication media (e.g., wired and wireless communications networks, local area networks, wide area networks, intranets, etc.).

Embodiments may be implemented in hardware, software, firmware, or a combination thereof. Embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A non-transitory computer-readable medium storing instructions that, when executed by a processor of an electronic device, cause the processor to perform operations, the operations comprising:

storing an IP address of a recipient in an accessible storage;

attempting delivery of a short message service (SMS) message to the recipient on a first network a first predetermined number of times according to a first predetermined time schedule, wherein the first predetermined number of times and the first predetermined time schedule are based on a retry mechanism on SIP that utilizes an increasing back-off interval between delivery attempts;

after a first failure to deliver the SMS message on the first network, attempting delivery of the SMS message on a second network according to a second predetermined time schedule;

after a second failure to deliver the SMS message on the second network, reattempting delivery of the SMS message on the first network;

while reattempting delivery of the SMS message on the first network, receiving a second SMS message for the recipient;

storing the second SMS message in a waitlist queue;

receiving a RADIUS feed associated with the SMS message;

extracting data from the RADIUS feed;

storing the data extracted in a call detail record comprising: a route index, a mobile directory number, a wide area network (WAN) IP address, or a virtual private network (VPN) IP address; and evaluating the call detail record comprising, determining SMS traffic patterns on the first network and on the second network.

2. The non-transitory computer-readable storage medium of claim 1, wherein the operations further comprise:

determining based on a policy adaption check: that the recipient of the SMS message is allowed to receive: an inter-carrier message, international messages, or shortcodes; that the recipient belongs to a subscription program; or that the recipient is allowed personalized features comprising message forwarding or permanent message storing.

3. The non-transitory computer-readable storage medium of claim 1, wherein the operations further comprise:
managing out-of-sequence issues, comprising attempting delivery of the SMS message according to a first-in-first-out (FIFO) mechanism using a realtime cache and the waitlist queue, wherein a first pending SMS message in the realtime cache is delivered before a second pending SMS message in the waitlist queue.

4. The non-transitory computer-readable storage medium of claim 1, wherein the first network is an IP network and the second network is a cellular network.

5. The non-transitory computer-readable storage medium of claim 4, wherein the IP network is at least one of: a WiFi network and a long term evolution (LTE) network.

6. The non-transitory computer-readable storage medium of claim 1, wherein the operations further comprise:
receiving a new registration for the recipient on the second network; and
attempting delivery of the SMS message on the second network.

7. The non-transitory computer-readable storage medium of claim 6, wherein the operations further comprise: waiting until a next registration check according to the second predetermined time schedule, for registration of the recipient on the first network before attempting the delivery of the SMS message on the second network.

8. The non-transitory computer-readable storage medium of claim 1, wherein the second predetermined time schedule comprises a registration check for the recipient at 30 seconds, 60 seconds, 2 minutes, 5 minutes, 10 minutes, 30 minutes and every two hours thereafter.

9. A method for an electronic device, comprising:
storing an IP address of a recipient in an accessible storage;
attempting delivery of a short message service (SMS) message to the recipient on a first network a first predetermined number of times according to a first predetermined time schedule,
wherein the first predetermined number of times and the first predetermined time schedule are based on a retry mechanism on SIP that utilizes an increasing back-off interval between delivery attempts;
after a first failure to deliver the SMS message on the first network, attempting delivery of the SMS message on a second network according to a second predetermined time schedule;
after a second failure to deliver the SMS message on the second network, reattempting delivery of the SMS message on the first network;
while reattempting delivery of the SMS message on the first network, receiving a second SMS message for the recipient;
storing the second SMS message in a waitlist queue;
receiving a RADIUS feed associated with the SMS message;
extracting data from the RADIUS feed;
storing the data extracted in a call detail record comprising: a route index, a mobile directory number, a wide area network (WAN) IP address, or a virtual private network (VPN) IP address; and
evaluating the call detail record comprising, determining SMS traffic patterns on the first network and on the second network.

10. The method of claim 9, further comprising: determining based on a policy adaption check: that the recipient of the SMS message is allowed to receive: an inter-carrier message, international messages, or shortcodes; that the recipient belongs to a subscription program; or that the recipient is allowed personalized features comprising message forwarding or permanent message storing.

11. The method of claim 9, further comprising: managing out-of-sequence issues, comprising attempting delivery of the SMS message according to a first-in-first-out (FIFO) mechanism using a realtime cache and the waitlist queue, wherein a first pending SMS message in the realtime cache is delivered before a second pending SMS message in the waitlist queue.

12. The method of claim 9, wherein the first network is an IP network and the second network is a cellular network.

13. The method of claim 12, wherein the IP network is at least one of: a WiFi network and a long term evolution (LTE) network.

14. The method of claim 9, further comprising:
receiving a new registration for the recipient on the second network; and
attempting delivery of the SMS message on the second network.

15. The method of claim 14, further comprising: waiting until a next registration check according to the second predetermined time schedule, for registration of the recipient on the first network before attempting the delivery of the SMS message on the second network.

16. A system comprising:
a memory;
a processor coupled to the memory, configured to:
store an IP address of a recipient in the memory;
attempt delivery of a short message service (SMS) message to the recipient on a first network a first predetermined number of times according to a first predetermined time schedule,
wherein the first predetermined number of times and the first predetermined time schedule are based on a retry mechanism on SIP that utilizes an increasing back-off interval between delivery attempts;
after a first failure to deliver the SMS message on the first network, attempt delivery of the SMS message on a second network according to a second predetermined time schedule;
after a second failure to deliver the SMS message on the second network, reattempt delivery of the SMS message on the first network;
while reattempting delivery of the SMS message on the first network, receive a second SMS message for the recipient;
store the second SMS message in a waitlist queue;
receive a RADIUS feed associated with the SMS message;
extract data from the RADIUS feed;
store the data extracted in a call detail record comprising: a route index, a mobile directory number, a wide area network (WAN) IP address, or a virtual private network (VPN) IP address; and
evaluate the call detail record comprising, determining SMS traffic patterns on the first network and on the second network.

17. The system of claim 16, wherein the processor is further configured to:
determine based on a policy adaption check: that the recipient of the SMS message is allowed to receive: an inter-carrier message, international messages, or shortcodes; that the recipient belongs to a subscription program; or that the recipient is allowed personalized features comprising message forwarding or permanent message storing.

18. The system of claim 16, wherein the processor is further configured to:

manage out-of-sequence issues, comprising attempting delivery of the SMS message according to a first-in-first-out (FIFO) mechanism using a realtime cache and the waitlist queue, wherein a first pending SMS message in the realtime cache is delivered before a second pending SMS message in the waitlist queue.

19. The system of claim 16, wherein the processor is further configured to:

receive a new registration for the recipient on the second network; and attempt delivery of the SMS message on the second network.

20. The system of claim 19, wherein the processor is further configured to: wait until a next registration check according to the second predetermined time schedule, for registration of the recipient on the first network before attempting the delivery of the SMS message on the second network.

* * * * *